United States Patent
MacFarlane et al.

(10) Patent No.: US 9,049,255 B2
(45) Date of Patent: Jun. 2, 2015

(54) VISUAL EVENT NOTIFICATION ON A HANDHELD COMMUNICATIONS DEVICE

(75) Inventors: Tammy MacFarlane, Waterloo (CA); Alain Gagne, Cambridge (CA); Chris Wormald, Kitchener (CA); Herbert Little, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 1748 days.

(21) Appl. No.: 12/040,306

(22) Filed: Feb. 29, 2008

(65) Prior Publication Data

US 2009/0219166 A1 Sep. 3, 2009

(51) Int. Cl.
| | |
|---|---|
| G08B 21/00 | (2006.01) |
| G08B 5/00 | (2006.01) |
| G08B 7/00 | (2006.01) |
| H04M 3/42 | (2006.01) |
| H04M 1/725 | (2006.01) |
| G09G 5/00 | (2006.01) |
| G06F 3/033 | (2013.01) |
| H04L 29/08 | (2006.01) |
| H04M 19/04 | (2006.01) |
| H04W 4/12 | (2009.01) |

(52) U.S. Cl.
CPC ............ *H04L 67/36* (2013.01); *H04M 1/72566* (2013.01); *H04M 1/72597* (2013.01); *H04M 19/04* (2013.01); *H04W 4/12* (2013.01)

(58) Field of Classification Search
USPC ........................................ 455/415, 458, 404.1
See application file for complete search history.

(56) References Cited

U.S. PATENT DOCUMENTS

| | | | |
|---|---|---|---|
| 6,813,491 B1 | 11/2004 | McKinney | |
| 6,897,850 B2* | 5/2005 | Sugimoto | ...................... 345/169 |
| 7,076,236 B2* | 7/2006 | Ihira et al. | .................. 455/404.1 |
| 7,627,349 B2* | 12/2009 | Vetelainen et al. | ........... 455/566 |
| 2003/0186704 A1* | 10/2003 | Tamura et al. | ................. 455/450 |
| 2005/0255828 A1* | 11/2005 | Fisher | ........................... 455/406 |
| 2006/0009241 A1* | 1/2006 | Ryu et al. | ....................... 455/458 |
| 2006/0019641 A1* | 1/2006 | Vayanos et al. | ............ 455/414.1 |

(Continued)

FOREIGN PATENT DOCUMENTS

| | | |
|---|---|---|
| CA | 2604505 A1 | 10/2006 |
| EP | 1696259 A1 | 8/2006 |

(Continued)

OTHER PUBLICATIONS

Corresponding Canadian Patent Application No. 2653878 Office Action dated May 9, 2012.

*Primary Examiner* — Jennifer Mehmood
*Assistant Examiner* — Pameshanand Mahase
(74) *Attorney, Agent, or Firm* — Perry + Currier, Inc.

(57) ABSTRACT

A method of event notification on a handheld communications device involves first receiving an indication of an occurrence of an event at the handheld communications device. The communications device comprises a display device, and the event has an associated notification definition for providing a visual notification of the occurrence of the event. The notification definition comprises a content parameter that specifies a scope of the content of the visual notification, and an action parameter that specifies the action to be taken on the communications device after the visual notification is initiated. Then, a visual notification of the occurrence is provided on the display device in accordance with the associated notification definition. The visual notification provides particulars of the event.

25 Claims, 6 Drawing Sheets

(56) References Cited

U.S. PATENT DOCUMENTS

| | | | |
|---|---|---|---|
| 2006/0119468 A1* | 6/2006 | Van Swaay | 340/5.1 |
| 2006/0223547 A1* | 10/2006 | Chin et al. | 455/456.1 |
| 2007/0037610 A1* | 2/2007 | Logan | 455/574 |
| 2008/0084332 A1* | 4/2008 | Ritter et al. | 340/989 |
| 2008/0147803 A1* | 6/2008 | Krzyzanowski et al. | 709/206 |
| 2008/0220752 A1* | 9/2008 | Forstall et al. | 455/415 |

FOREIGN PATENT DOCUMENTS

| | | |
|---|---|---|
| GB | 2349305 A1 | 10/2000 |
| WO | 9703432 A1 | 1/1997 |
| WO | 2005/109840 A1 | 11/2005 |
| WO | 2005109840 A1 | 11/2005 |

* cited by examiner

VISUAL EVENT NOTIFICATION ON A HANDHELD COMMUNICATIONS DEVICE

FIELD

This disclosure relates to a method of providing notification of the occurrence of an event on a handheld communications device.

BACKGROUND

Many modern handheld communication devices, such as e-mail pagers, wireless telephones and personal digital assistants (PDAs) notify the user of the occurrence of an event, such as an incoming telephone call, commencement of a previously-scheduled meeting, or an incoming e-mail message. These notifications are typically audible or tactile. For instance, the communications device might play a tune upon receipt of an incoming telephone call or at a predetermined time prior to commencement of the meeting, or vibrate upon receipt of an incoming e-mail message.

Audible notifications are advantageous since they can provide the user with notification of the event without the communications device being in immediate proximity to the user. However, audible notifications can be problematic if the user is in a meeting, movie theatre, library or other location requiring minimal audible disturbances. Tactile notifications are advantageous since they can provide notification of the event without disturbing individuals nearby. However, both audible and tactile notifications do not provide any meaningful information concerning the substance of the event, thereby requiring the user to remove the communications device from its holster to identify the purpose of the notification. Further, to avoid disturbing other individuals, the user will typically disable the notification function prior to the meeting, thereby increasing the likelihood of an important event occurring without notice to the user.

DETAILED DESCRIPTION

Figure 1:
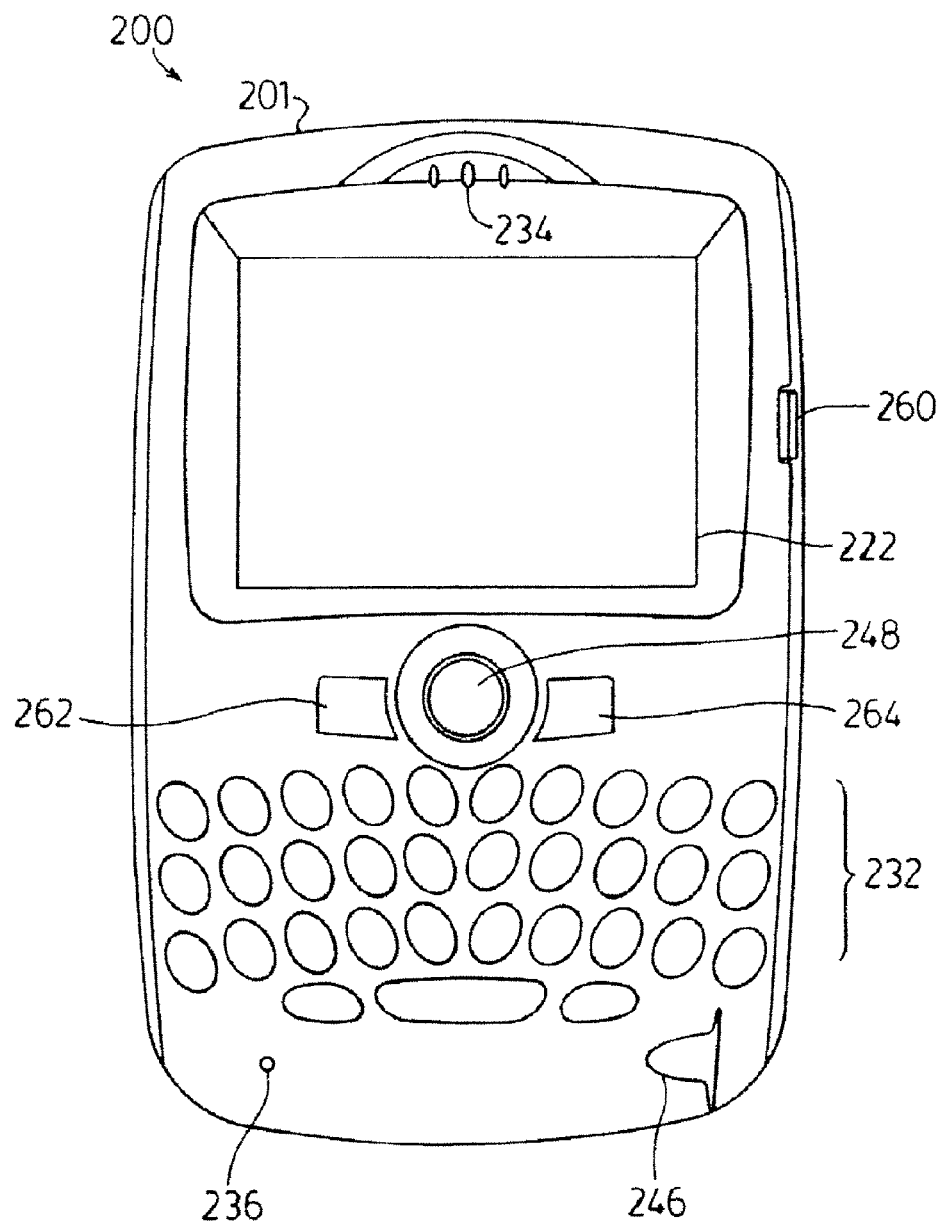
FIG. 1 is a front plan view of a handheld communications device.

By way of overview, in a first aspect this disclosure relates to a handheld communications device that provides a visual informative notification of the occurrence of an event at the communications device. As will be described in further detail below, the handheld communications device comprises a display device, at least one notification record, and an event notifier in communication with the display device and the notification record(s). Each notification record is associated with an event at the communications device, and comprises a notification definition for providing a visual notification of occurrence of the event. The notification definition comprises a content parameter that specifies the scope of the content of the visual notification, and an action parameter that specifies the action to be taken on the communications device after the visual notification is initiated. The event notifier is configured to receive an indication of the occurrence of one of the events, and to provide a visual notification of the occurrence on the display device in accordance with the associated notification definition. The visual notification provides particulars of the event.

The communications device may comprise a user data input device, and the display device may include a light source for illuminating information rendered on the display device. Further, the event may comprise an incoming message, a calendar appointment, and/or a predefined task.

The communications device may provide the visual notification by activating the light source upon the occurrence of the event, and rendering the particulars of the event on the display device. Typically, the visual notification is provided while the communications device is in an idle state. If the user data input device is used within a predefined period after the light source is activated, the communications device may maintain the light source active, and may optionally update a read status that is associated with the event. The communications device may also de-activate the light source if the user data input device is not used within a predefined period after the time instant the light source is activated or the user data input device is last used.

The communications device may include a motion sensor. In this variation, if the motion sensor detects movement of the communications device within a predefined period after the light source is activated, the communications device may maintain the light source active, and optionally may update a read status that is associated with the event. The communications device may also de-activate the light source if the motion sensor does not detect movement of the communications device within a predefined period after the time instant the light source is activated or the communications device is last moved.

The event may be associated with a software application on the handheld communications device, which may comprise an e-mail software application, a text message software application, and/or a due date reminder software application. Upon the occurrence of the event, the software application may open a notification window on the display device, and display the particular of the event in the notification window. The software application may close the notification window if the user data input device is not used within a predefined period after the time instant the light source is activated, the notification window is opened, or the user data input device is last used. Alternately, the software application may close the notification window if the motion sensor does not detect movement of the communications device within a predefined period after the time instant the light source is activated, the notification window is opened, or the communications device is last moved.

In a second aspect, this disclosure relates to a method of event notification on a handheld communications device that involves receiving an indication of an occurrence of an event on the handheld communications device. The event has an associated notification definition for providing visual notification of the occurrence of the event. The notification definition comprises a content parameter that specifies a scope of the content of the visual notification, and an action parameter that specifies the action to be taken on the communications device after the visual notification is initiated. Then, a visual notification of the occurrence is provided on a display device of the communications device in accordance with the associated notification definition. The visual notification provides particulars of the event.

In a third aspect, this disclosure relates to a computer readable medium that carries processing instructions for an electronic communications device that comprises a display device. The processing instructions, when executed by a computer processor of the communications device, enables the device to implement a method of event notification on the communications device.

As will be described in further detail below, the method begins by receiving an indication of an occurrence of an event on the communications device. The event has an associated notification definition for providing visual notification of the occurrence of the event. The notification definition comprises a content parameter that specifies a scope of the content of the visual notification, and an action parameter that specifies the action to be taken on the communications device after the visual notification is initiated. Then, a visual notification of the occurrence is provided on the display device in accordance with the associated notification definition. The visual notification provides particulars of the event.

Turning now to FIG. 1, there is shown a sample handheld communications device 200. Preferably, the handheld communications device 200 is a two-way wireless communications device having at least voice and data communication capabilities, and is configured to operate within a wireless cellular network. Depending on the exact functionality provided, the wireless handheld communications device 200 may be referred to as a data messaging device, a two-way pager, a wireless e-mail device, a cellular telephone with data messaging capabilities, a wireless Internet appliance, or a data communication device, as examples.

As shown, the handheld communications device 200 includes a display device 222, a function key 246, and a data processing device 202 (see FIG. 2) disposed within a common housing 201. Optionally, the handheld communications device 200 includes a motion sensor 266 (FIG. 3) in communication with the data processing device.

The data processing device 202 is in communication with the display device 222 and the function key 246. Preferably, the display device 222 comprises a liquid crystal display (LCD), and includes a display light that emits visible light to enhance the readability of information rendered on the display device 222. In one implementation, the display device 222 comprises a transmissive liquid crystal display, the display light comprises a backlight, and the function key 246 operates as a power on/off and backlight switch. In another implementation, the display device 222 comprises a reflective or trans-reflective liquid crystal display, the display light comprises a frontlight (for the reflective liquid crystal display) or a backlight (for the trans-reflective liquid crystal display), and the function key 246 operates as a front/backlight switch.

In addition to the display device 222 and the function key 246, the handheld communications device 200 includes user data input device for inputting data to the data processing device 202. As shown, the user data input device includes a keyboard 232, a trackball 248 and an escape key 260. The keyboard 232 includes alphabetic and numerical keys, and preferably also includes a "Call" key 262 and an "End" key 264 to respectively initiate and terminate voice communication. However, the data input device is not limited to these forms of data input. For instance, the data input device may include a thumbwheel or other pointing device instead of (or in addition to) the trackball 248.

Figure 2:
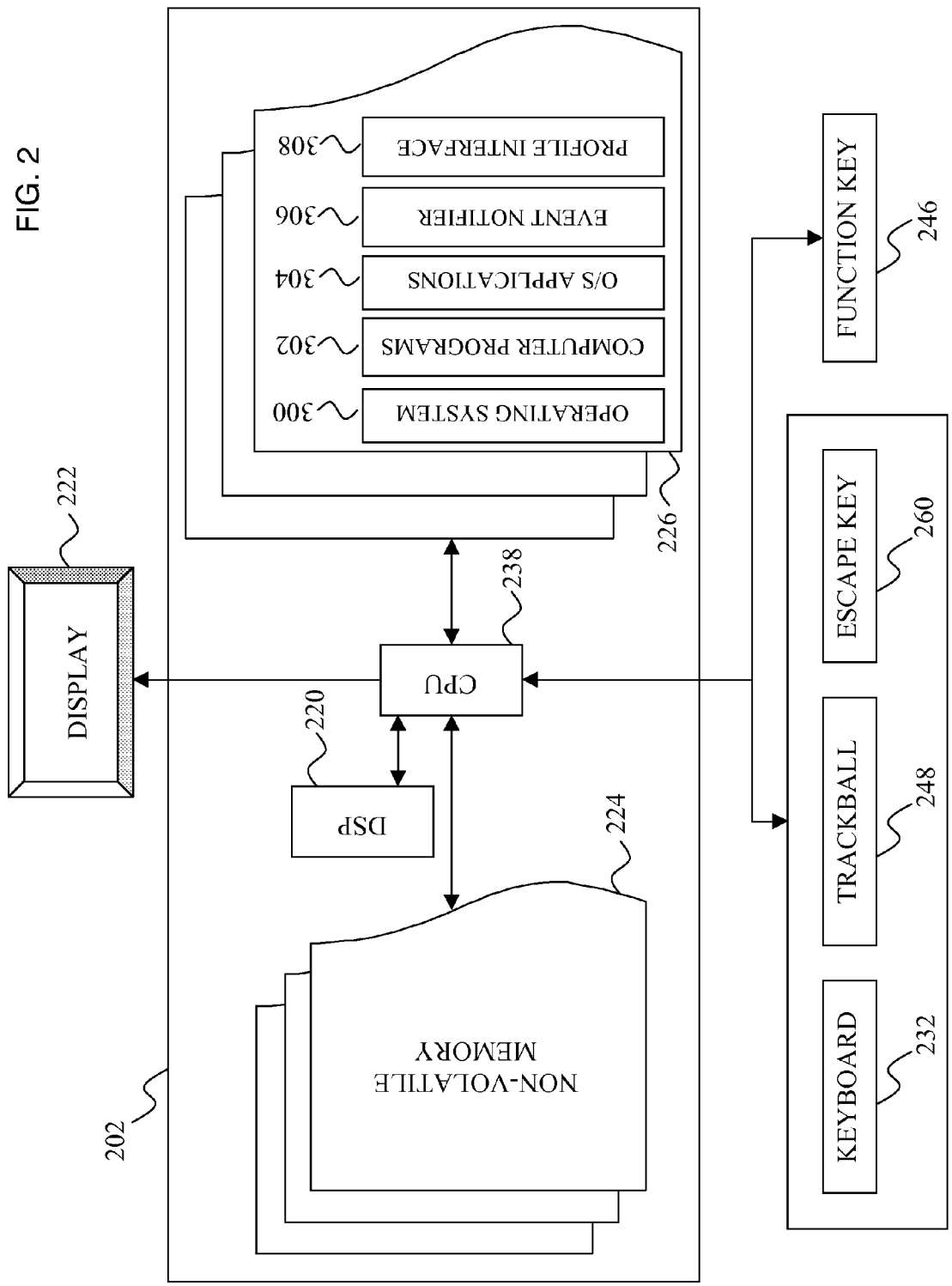
FIG. 2 is a schematic diagram depicting certain functional details of the data processing device of the handheld communications device, including the display device, the data input device, the motion sensor, and the event notifier.

As shown in FIG. 2, the data processing device 202 comprises a microprocessor (also referred to as central processing unit or "CPU") 238 in communication with flash memory 224 and volatile memory (RAM) 226. The flash memory 224 includes computer processing instructions which, when executed by the microprocessor 238, implement an operating system 300, computer programs 302, and operating system specific applications 304. Alternately, the computer processing instructions may be copied from the flash memory 224 into the RAM 226 upon system reset or power-up, and executed by the microprocessor 238 out of the RAM 226.

The operating system 300 comprises an Open Systems Interconnection (OSI) communication protocol stack that allows the handheld communications device 200 to send and receive information over a wireless cellular network and/or a local area wireless network. Typically, the computer programs 302 include software applications, such as e-mail, IM (Instant Messaging) or SMS (Short Message Service) communication programs which allows the user to send and receive e-mail, IM or SMS messages, telephony software that allows the user to initiate and/or receive telephone calls (either via a long-range wireless cellular network and/or a short-range WLAN network), browser software which allows the user to communicate with resources over the internet, calendar software which diarizes due dates and/or appointments of importance to the user, and/or task management software which tracks of the status of tasks of importance to the user. However, the invention is not limited to any particular type of computer program.

As shown, the operating system 300 includes an event notifier 306, and a notification profile interface 308. As will be described below, the event notifier 306 is configured to receive notification from one of the computer programs 302 that an event has occurred, and to provide a visual notification of the occurrence of the event via the display device 222. Although the event notifier 306 is preferably implemented as computer software, the event notifier 306 may also be implemented as an electronic circuit.

The notification profile interface 308 is a user interface that allows the user to create notification profiles which define the manner in which the event notifier 308 provides the visual notification. The notification profile interface 308 also allows the user to activate the notification profile which is most suitable for the environment in which the visual notification is desired. For instance, if the user is attending a contract drafting meeting in which some participants are attending remotely, the user might activate a notification profile which only provides visual notification of incoming telephone calls or e-mail/IM/SMS messages from certain specified individuals or domains. If the user is working in his/her office, the user might activate a notification profile which provides visual notification of all meetings, tasks, and incoming calls and messages.

In addition to the computer processing instructions, the memory 224, 226 also includes one or more event definition records, each associated with one or more events. As will be explained, the event may comprise any of number of different items for which the user desires to receive visual notification, such as an incoming message, a predefined calendar event, a predefined task or a low battery warning. Preferably, each event is associated with one of the computer programs 302 or operating system specific applications 304, and the user defines the contents of the associated event definition record via the computer program 302 or operating system specific application 304 that is associated with the event.

Each event definition record comprises an event ID tag, and one or more trigger conditions which make up an event definition. The event definition defines when the associated event(s) has/have occurred. The trigger conditions might be satisfied contemporaneously with the occurrence of the event. For instance, the event might comprise an incoming message, such as an e-mail, IM or a SMS message, with the associated trigger condition simply being receipt of the message at the handheld communications device 200. The event might comprise an incoming call, such as a wireless cellular, voice-over-IP (VoIP) or instant message communication, with the associated trigger condition simply being receipt of the call at the handheld communications device 200 from one or more specified individuals or telephone numbers. Alternately, the trigger condition might be a subject line, urgency status, or address of the sender of a message. The event might comprise a calendar appointment or a task having an associated due date which was specified using the associated calendar or task software when the calendar appointment or the task was created, with the associated trigger condition being the date of the appointment or the due date of the task. The event might comprise a low battery voltage, with the associated trigger condition simply being satisfied if the battery voltage of the battery that is providing power to the handheld communication device 200 is less than a predetermined threshold.

Alternately, the trigger conditions might be satisfied subsequent to the occurrence of the event. For instance, the event might comprise an incoming message or call, with the associated trigger condition being satisfied if the communication was not answered within a specified period of time after the time instant that the communication was received at the handheld communications device 200. The trigger conditions might also be satisfied prior to the occurrence of the event. For instance, the event might comprise a calendar appointment or a task, with the associated trigger condition being a specified period of time prior to the due date.

Preferably the memory 224, 226 also includes one or more notification definition records, each associated with one or more event definition records. Each notification definition record comprises one or more event ID tags, and one or more notification parameters which make up a notification definition for the associated event(s). Preferably, the user accesses the notification definition records via the notification profile interface 308, which allows the user to specify the notification parameters of each notification definition.

Typically, each notification definition record is associated with a class of events via one or more event ID tags. For instance, one notification definition might comprise a message class notification definition which is applicable to all incoming messages that are received at the handheld computing device 200, in which case the notification definition record would include an event ID tag that is associated with an event that is triggered by any incoming message. Another notification definition might comprise a calendar class notification definition which is applicable to all calendar events that are defined in the calendar software, in which case the notification definition record would include an event ID tag that is associated with an event that is triggered by the occurrence of any calendar event. Another notification definition might comprise a task class notification definition which is applicable to all tasks that are defined in the task software, in which case the notification definition record would include an event ID tag that is associated with an event that is triggered by the due date of any task.

Alternately, a notification definition record might be associated with one or more discrete events. For instance, one notification definition might comprise a message event notification definition which is applicable to all incoming messages that are received from a specific individual, in which case the notification definition record would include an event ID tag that is associated with an event that is triggered by an incoming message issued by that specific individual. Another notification definition might comprise a calendar event notification definition which is only applicable to a specific calendar event, in which case the notification definition record would include an event ID tag that is associated with an event that is triggered by the occurrence of that specific calendar event. Another notification definition might comprise a task event notification definition which is only applicable for a specific task, in which case the notification definition record would include an event ID tag that is associated with an event that is triggered by the due date of that specific task.

The notification definition typically also includes a user-definable content parameter that specifies the scope of the content of the required visual notification. Preferably, the content parameter requires the event notifier 306 to indicate the particulars of the event. For instance, in the case of an incoming e-mail or SMS message, the content parameter could require the event notifier 306 to cause the appropriate message software to open a notification window on the display device 222, and to display in the notification window a list indicating the subject line of a portion or all of the messages that have been received by the handheld communications device 200. The content parameter could require the event notifier 306 to cause the message software to display detailed information about the message last received, such as the originator of the message, subject line and/or all or a portion of the message.

In the case of a calendar event or a task, the content parameter could require the event notifier 306 to cause the calendar software to open a notification window on the display device 222 and to display a calendar indicating the subject matter of a portion or all of the calendar events defined in the calendar software. The content parameter could require the event notifier 306 to cause the calendar software to display detailed information about the most recent calendar event, such as the date/time/location of the appointment. The content parameter could require the event notifier 306 to cause the task management software to open a notification window on the display device 222 and to display a list indicating the subject line of a portion or all of the tasks defined in the task management software. The content parameter could require the event notifier 306 to cause the task management software to display details of the task in the notification window.

The notification definition might also include one or more user-definable action parameters that specify the action taken on the communications device 200 after the visual notification is initiated. Typically, one action parameter would require the event notifier 306 to activate the display light of the display device 222 after the occurrence of the event, if the handheld communications device 200 is removed from its holster. Another action parameter could require the event notifier 306 to de-activate the display light if the user data input device is not used within a predefined period after the time instant the display light is activated. Alternately, an action parameter could require the event notifier 306 to de-activate the backlight if the user data input device is not used within a predefined period after the user data input device is last used.

Another action parameter could require the event notifier 306 to maintain the display light on if the user data input device is used within a predefined period after the display light is activated. In the case, if the event is an incoming message, the action parameter could optionally also require the computer program 302 that is associated with the event to update a read status for the incoming message to indicate that the user read the message. Yet another action parameter could require the event notifier 306 to maintain in the memory 224, 226 a history of the event when triggered, and/or a history of the event if the user did not respond to the visual notification within a time specified in the notification definition.

As discussed above, the handheld communications device 200 may include a motion sensor 266. In this variation, one action parameter could require the event notifier 306 to de-activate the display light if the motion sensor 266 does not detect movement of the handheld communications device 200 within a predefined period after the time instant the display light is activated. Alternately, an action parameter could require the event notifier 306 to de-activate the display light if the motion sensor 266 does not detect movement of the handheld communications device 200 within a predefined period after the handheld communications device 200 is last moved or the user data input device is last used.

Another action parameter could require the event notifier 306 to maintain the display light on if the motion sensor 266 detects movement of the handheld communications device 200 within a predefined period after the display light is activated. In the case, if the event is an incoming message, the action parameter could optionally also require the computer program 302 that is associated with the event to update a read status for the incoming message to indicate that the user read the message.

As discussed above, preferably event notifier 306 causes the computer program 302 that is associated with the event to open a notification window on the display device 222 to display the visual notification of the event. One action parameter could require the event notifier 306 to cause the computer program 302 to close the notification window if the user data input device is not used within a predefined period after the time instant the display light is activated, the notification window is opened, or the user data input device is last used. Another action parameter could require the event notifier 306 to cause the computer program 302 to close the notification window if the motion sensor 266 does not detect movement of the communications device 200 within a predefined period after the time instant the display light is activated, the notification window is opened, or the communications device is last moved. As will be appreciated, the motion sensor 266 may comprise any type of motion sensor that can detect the forms of movement described herein, including but not limited to an accelerometer-based motion sensor and/or a light sensor-based motion sensor.

Figure 3:
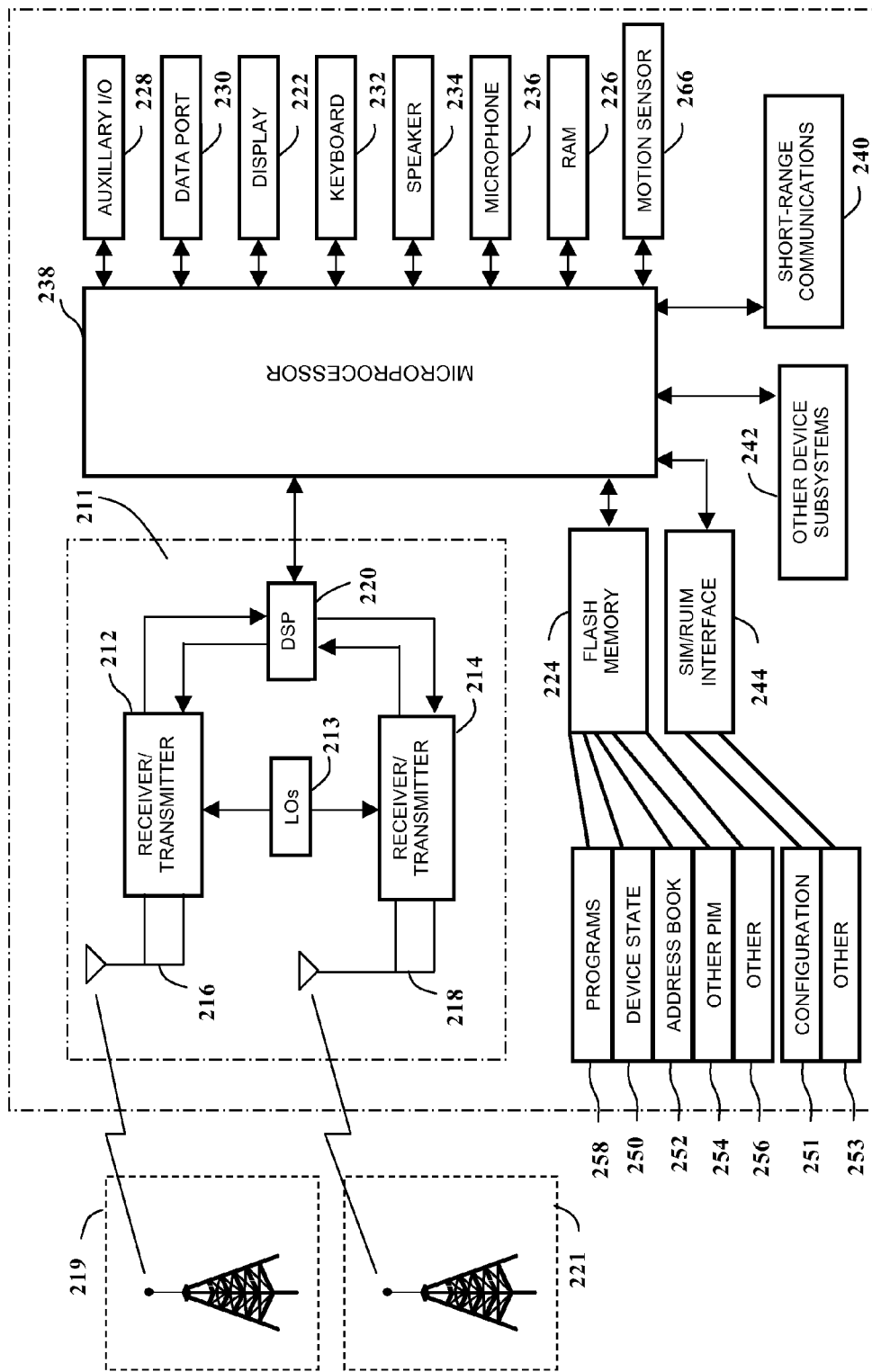
FIG. 3 is a schematic diagram depicting certain additional functional details of the handheld communications device.

FIG. 3 depicts functional details of the handheld communications device 200. As shown, the handheld communications device 200 incorporates a motherboard that includes a communication subsystem 211, and a microprocessor 238. The communication subsystem 211 performs communication functions, such as data and voice communications, and includes a primary transmitter/receiver 212, a secondary transmitter/receiver 214, a primary internal antenna 216 for the primary transmitter/receiver 212, a secondary internal antenna 218 for the secondary transmitter/receiver 214, and local oscillators (LOs) 213 and one or more digital signal processors (DSP) 220 coupled to the transmitter/receivers 212, 214.

Typically, the communication subsystem 211 sends and receives wireless communication signals over a wireless cellular network via the primary transmitter/receiver 212 and the primary internal antenna 216. Further, typically the communication subsystem 211 sends and receives wireless communication signals over a local area wireless network via the secondary transmitter/receiver 214 and the secondary internal antenna 218.

Preferably, the primary internal antenna 216 is configured for use within a Global System for Mobile Communications (GSM) cellular network or a Code Division Multiple Access (CDMA) cellular network. Further, preferably the secondary internal antenna 218 is configured for use within a WLAN WiFi (IEEE 802.11x) or Bluetooth network. Although the handheld communications device 200 is depicted in FIG. 2 with two antennas, it should be understood that the handheld communications device 200 may instead comprise only a single antenna, with a dual-band antenna being connected to both the primary transmitter/receiver 212 and the secondary transmitter/receiver 214.

Signals received by the primary internal antenna 216 from the wireless cellular network are input to the receiver section of the primary transmitter/receiver 212, which performs common receiver functions such as frequency down conversion, and analog to digital (A/D) conversion, in preparation for more complex communication functions performed by the DSP 220. Signals to be transmitted over the wireless cellular network are processed by the DSP 220 and input to transmitter section of the primary transmitter/receiver 212 for digital to analog conversion, frequency up conversion, and transmission over the wireless cellular network via the primary internal antenna 216.

Similarly, signals received by the secondary internal antenna 218 from the local area wireless network are input to the receiver section of the secondary transmitter/receiver 214, which performs common receiver functions such as frequency down conversion, and analog to digital (A/D) conversion, in preparation for more complex communication functions performed by the DSP 220. Signals to be transmitted over the local area wireless network are processed by the DSP 220 and input to transmitter section of the secondary transmitter/receiver 214 for digital to analog conversion, frequency up conversion, and transmission over the local area wireless network via the secondary internal antenna 218.

The communications device 200 also includes a SIM interface 244 if the handheld communications device 200 is configured for use within a GSM network, and/or a RUIM interface 244 if the handheld communications device 200 is configured for use within a CDMA network. The SIM/RUIM interface 244 is similar to a card-slot into which a SIM/RUIM card can be inserted and ejected like a diskette or PCMCIA card. The SIM/RUIM card holds many key configurations 251, and other information 253 including subscriber identification information, such as the International Mobile Subscriber Identity (IMSI) that is associated with the handheld communications device 200, and subscriber-related information.

The microprocessor 238, in conjunction with the flash memory 224 and the RAM 226, comprises the aforementioned data processing device 202 and controls the overall operation of the device. The data processing device 202 interacts with device subsystems such as the display device 222, flash memory 224, RAM 226, auxiliary input/output (I/O) subsystems 228, data port 230, keyboard 232, speaker 234, microphone 236, short-range communications subsystem 240, and device subsystems 242. The data port 230 may comprise a RS-232 port, a Universal Serial Bus (USB) port or other wired data communication port.

As shown, the flash memory 224 includes both computer program storage 258 and program data storage 250, 252, 254 and 256. The computer program storage 258 stores the computer processing instructions. However, the computer processing instructions may also be loaded into a volatile memory such as RAM 226. The computer processing instructions, when accessed from the memory 224, 226 and executed by the microprocessor 238 define the operating system, computer programs, and operating system specific applications. The computer processing instructions may be installed onto the handheld communications device 200 upon manufacture, or may be loaded through the cellular wireless network, the auxiliary I/O subsystem 228, the data port 230, the short-range communications subsystem 240, or the device subsystem 242. In addition to the functions previously described herein, the operating system allows the handheld communications device 200 to operate the display device 222, the auxiliary input/output (I/O) subsystems 228, data port 230, keyboard 232, speaker 234, microphone 236, short-range communications subsystem 240, and device subsystems 242.

The program data storage 250, 252, 254, 256 stores data required by the operating system, the computer programs and the operating system specific applications. Preferably, one of the program data storage 250, 252, 254, 256 stores the aforementioned event definitions and notification definitions.

In data communication mode, a received text message or web page download will be processed by the communication subsystem 211 and output to the display device 222, or alternatively to an auxiliary I/O device 228. A user of the handheld communications device 200 may compose data items such as email messages for example, using the keyboard 232. Such composed items may then be transmitted over the wireless cellular network or the local area wireless network through the communication subsystem 211.

For voice communications, overall operation of the handheld communications device 200 is similar, except that received signals would preferably be output to the speaker 234 and signals for transmission would be generated by a microphone 236. Further, the display device 222 may provide an indication of the identity of a calling party, the duration of a voice call, or other voice call related information for example.

Figure 4:
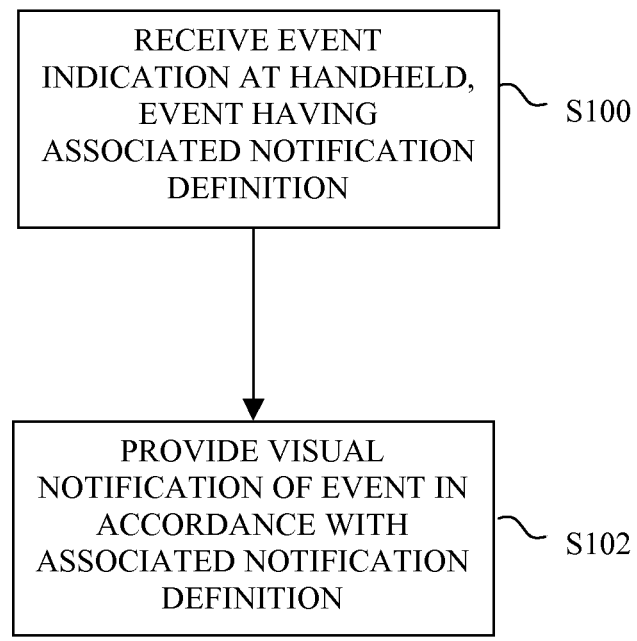
FIG. 4 is a flow chart depicting, by way of overview, a method performed by the handheld communications device when providing notification of an event on the handheld communications device.

FIG. 4 is a flow chart that depicts, by way of overview, the method implemented in the handheld communications device 200 for providing notification of an event on the handheld communications device 200.

At step S100, the event notifier 302 receives an indication that an event has occurred at the handheld communications device 200. As discussed above, each event is associated with an event definition comprising one or more trigger conditions which define when the associated event has occurred. Therefore, the event notifier 302 receives the event indication if the trigger condition(s) in one of the event definitions are satisfied. Typically, the event notifier 302 receives the event indication from one of the computer programs 302 or operating system specific applications 304.

After the event notifier 302 receives the event indication, at step S102 the event notifier 302 provides a visual notification, via the display device 222, that the event has occurred. Preferably, the visual notification indicates the subject matter of the event. As discussed above, each event has an associated notification definition which identifies one or more parameters for providing a notification that the event has occurred. Therefore, the event notifier 302 provides the visual notification in accordance with the associated notification definition.

Figure 5A:
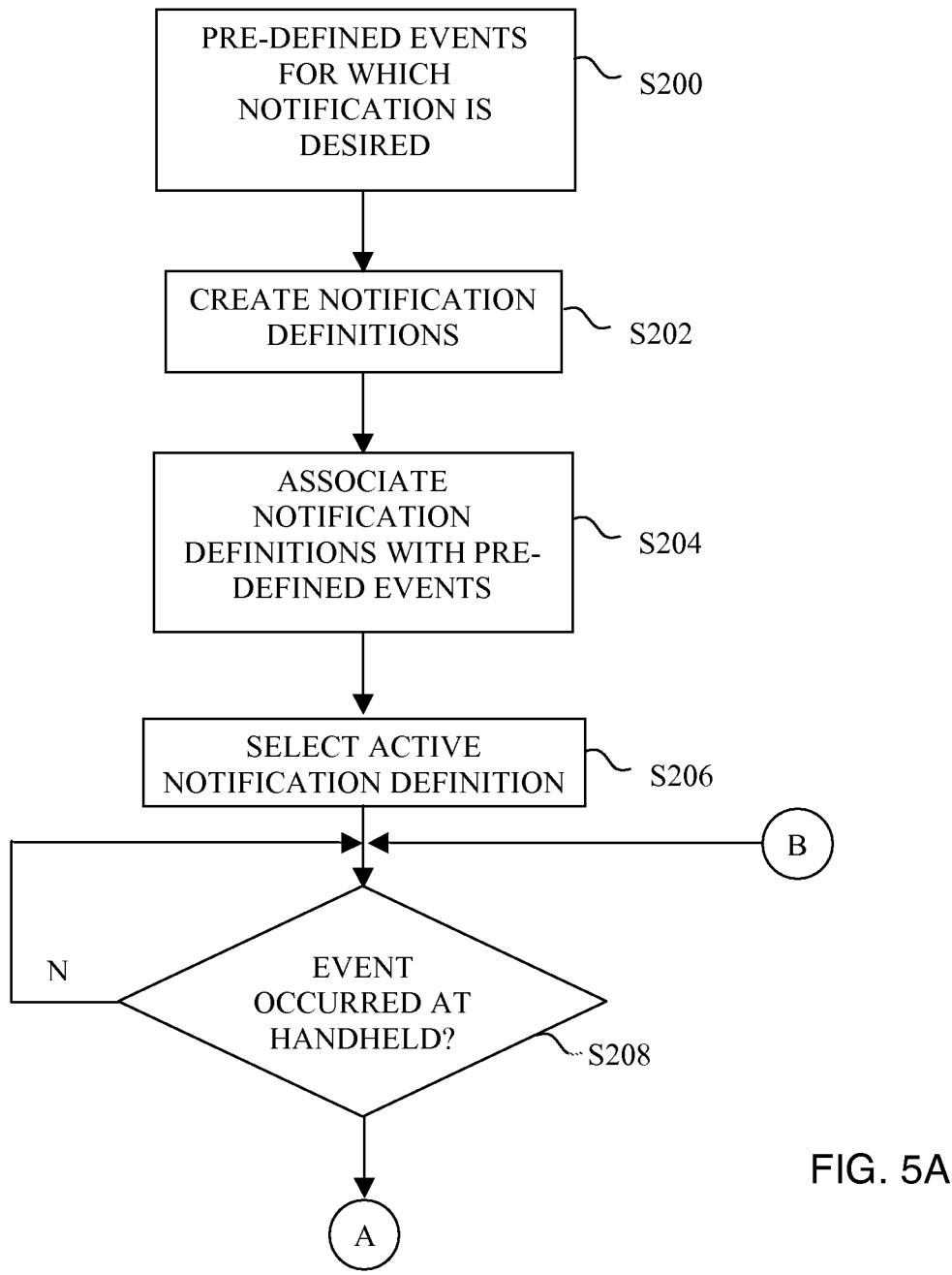
FIGS. 5*a* and 5*b* together comprise a flow chart that depicts, in detail, a method performed by the handheld communications device when providing the notification of the event.
Figure 5B:
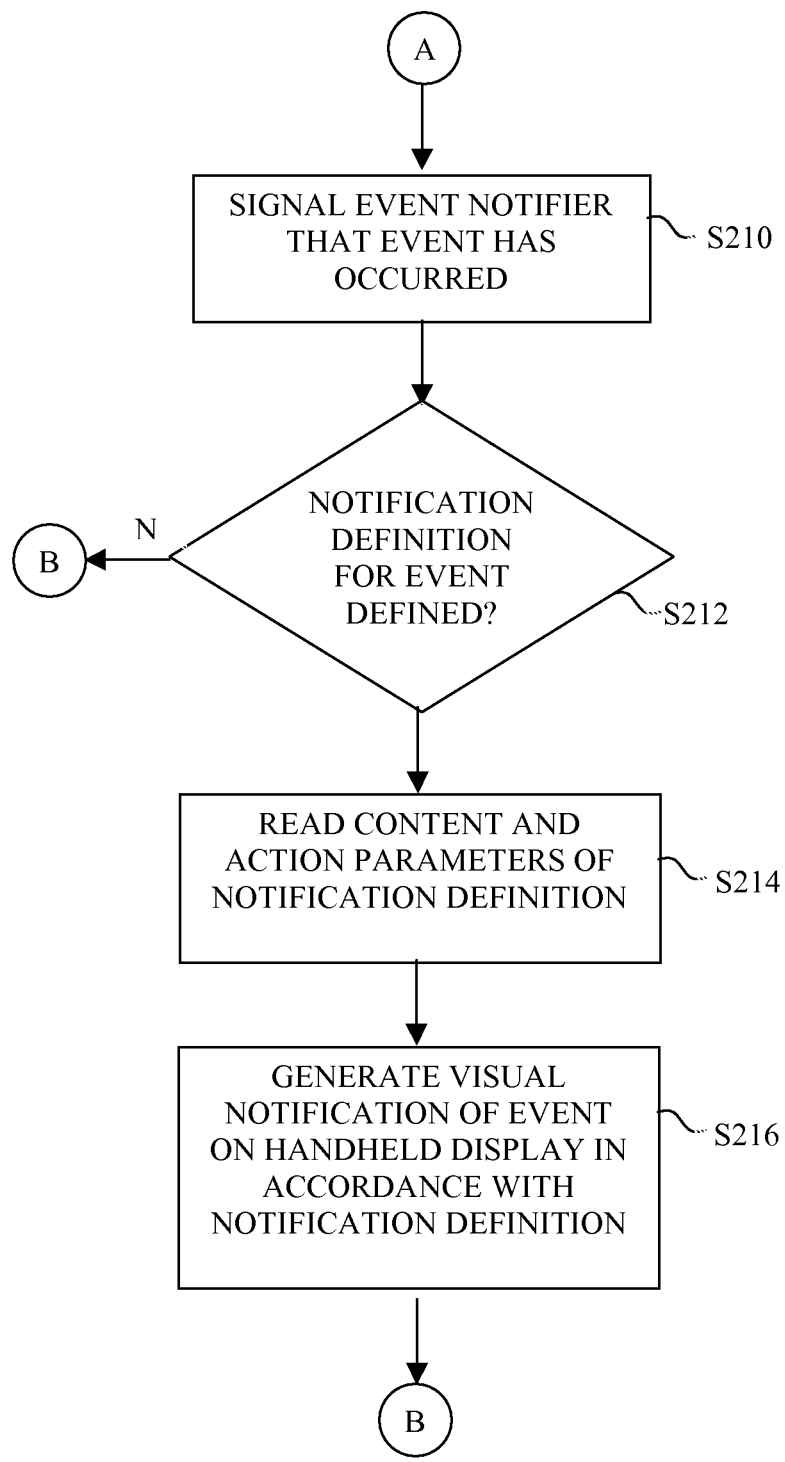

FIGS. 5a and 5b depict, in detail, the sequence of steps performed by the handheld communications device 200 when providing notification of an event on the handheld communications device 200. At step S200, the user of the handheld communications device 200 invokes one of the computer programs 302 and pre-defines one or more events for which a reminder/notification is desired, by specifying the associated trigger conditions and particulars for the events.

For instance, the user might invoke the e-mail software and pre-define a message event by entering the trigger conditions (e.g. subject line, e-mail address of sender, urgency status) of a future incoming e-mail message. The user might invoke the calendar software and pre-define a calendar event by entering the trigger conditions (e.g. time, date, advance notice period) and particulars (e.g. location, topic, attendees) of an appointment. The user might invoke the task management software and pre-define a task event by entering the trigger conditions (e.g. due date, advance notice period) and particulars (e.g. project title, file number) of a task. In each case, the invoked computer program 302 saves the event definitions of each event in the event definition records.

It should be understood, however, that the user need not pre-define an event at step S200. Rather, one or more of the computer programs 302 may be configured with one or more pre-defined events. For instance, in the case of an incoming e-mail or SMS message, typically the e-mail software or the SMS software is configured to generate an event contemporaneously with the time instant of receipt of the incoming message.

At step S202, the user of the handheld communications device 200 accesses the notification profile interface 308, and creates one or more notification definitions for one or more of the events, by specifying the associated notification parameters for the desired visual notifications.

For example, if the user pre-defined a message event at step S200, the user might specify a content parameter, at step S202, that required the event notifier 306 to provide a visual notification indicating that the handheld communications device 200 has received an incoming message. Alternately, the user might specify a content parameter, at step S202, that required the event notifier 306 to provide a visual notification which included the name and/or picture of the originator of the message, the subject line of the message, and a portion of the text/body of the message.

If the user pre-defined a calendar event at step S200, the user might specify a content parameter, at step S202, that required the event notifier 306 to provide a visual notification simply indicating that the appointment was about to begin. Alternately, the user might specify a content parameter, at step S202, that required the event notifier 306 to provide a visual notification which identified the date, time and/or location of the appointment.

If the user pre-defined a task event at step S200, the user might specify a content parameter, at step S202, that required the event notifier 306 to provide a visual notification simply indicating that the task was due for completion. Alternately, the user might specify a content parameter, at step S202, that required the event notifier 306 to provide a visual notification which identified the due date, project title, and file number of the task.

Further, as discussed above, preferably each notification definition includes one or more action parameters which specify the action taken when the visual notification is initiated. Therefore, the user might specify an action parameter, at step S202, that required the event notifier 306 to activate the display light of the display device 222 upon the occurrence of the event. The user might specify an action parameter, at step S202, that required the event notifier 306 to de-activate the display light and/or close the notification window if the user data input device was not used and/or the handheld communications device 200 was not moved, within a specified period after the time instant the display light was activated, the notification window was opened, the user data input device was last used and/or the handheld communications device 200 was last moved.

The user might specify an action parameter, at step S202, that required the event notifier 306 to maintain the display light on if the user data input device was used or the handheld communications device 200 was moved, within a specified period after the display light was activated. If the user pre-defined a message event at step S200, the user might also specify an action parameter, at step S202, that required the event notifier 306 to require the computer program 302 that is associated with the message event to update a read status for the incoming message to indicate that the user read the message (again if the user data input device was used, or the handheld communications device 200 was moved, within a specified period after the display light was activated).

At step S204, the user uses the notification profile interface 308 to associate the notification definitions with the events for which notification is desired. As discussed above, a notification definition might be intended for use with a class of events. Accordingly, the user might, for instance, associate the notification definition with all incoming messages that are received at the handheld computing device 200. Alternately, the user might associate the notification definition with all calendar events that are defined in the calendar software or all tasks that are defined in the task software.

However, a notification definition might instead be intended for use with one or more discrete events. Therefore, the user might, for instance, associate the notification definition with all incoming messages that are received from a specific individual. Alternately, the user might associate the notification definition with a specific calendar event or specific task. In each case, the operating system 300 saves the notification parameters of each notification definition, and their associations, in the notification definition records.

Preferably, the notification profile interface 308 allows the user to save multiple notification definitions, and to select one or more notification definitions as the active notification definition(s) to be used in responding to subsequent trigger events. For instance, as discussed above, the user might create a notification definition which only provides visual notification of incoming messages from certain specified individuals or domains, and create another notification definition which provides visual notification of all meetings, tasks, and incoming messages. Accordingly, at step S206, the user selects the desired "active" notification definition(s) from the saved notification definitions.

Further, the user might create a notification definition that causes the notification profile interface 308 to revert back to a previously-selected active notification definition upon the occurrence of an event. For instance, the notification definition might include an action parameter that requires the notification profile interface 308 to select an alternate or default notification profile after a specified time period has elapsed, or the communications device 200 is inserted into its holster. If the notification definition is associated with a calendar event, the notification definition might include an action parameter that requires the notification profile interface 308 to select an alternate or default notification profile after the time period for the calendar event has expired (i.e. the meeting is over). Thereafter, typically the handheld communications device 100 is left in an idle state, in which the user is not operating any of the data input devices. Further, the display light (if equipped) is typically inactive.

At step S208, the handheld communications device 100 determines whether an event has occurred at the handheld communications device 100. Typically, the handheld communications device 100 determines whether an event has occurred by querying the trigger conditions that the user saved in the event definition records at step S100.

For instance, if the handheld communications device 100 received an incoming e-mail message, the e-mail software would access the event definition records to determine whether the e-mail message satisfied the trigger conditions (e.g. subject line, e-mail address of sender, urgency status) of one of the events saved in the event definition records. If the user pre-defined a calendar event at step S100, the calendar software would determine whether the trigger conditions (e.g. time, date, advance notice period) of a calendar event saved in one of the event definition records were satisfied. Similarly, if the user pre-defined a task event at step S100, the task management software would determine whether the trigger conditions (e.g. time, date, advance notice period) of a task event saved in one of the event definition records were satisfied.

Alternately, however, an event might not be defined in the event definition records, but might instead might be configured into one of the computer programs 302 or operating system specific applications 304. For instance, as discussed above, the trigger conditions might be satisfied simply upon receipt of an e-mail, IM or SMS message at the handheld communications device 200. Alternately, the trigger conditions might be satisfied if the battery voltage of the battery that is providing power to the handheld communications device 200 is less than a predetermined threshold.

If the trigger conditions of one of the event definitions are satisfied, at step S210 the computer program 302 or operating system specific application 304 that is associated with the event definition signals the event notifier 306 that an event has occurred at the handheld communications device 200. The computer program 302 or operating system specific application 304 may issue the event indication as a software interrupt signal to the event notifier 306. Alternately, the computer program 302 or operating system specific application 304 may invoke the event notifier 306 if the trigger conditions are satisfied. Alternately still, the computer program 302 or operating system specific application 304 may write an event indication to the program data storage areas 250, 252, 254, 256, with the event notifier 306 being configured to periodically poll the program data storage areas 250, 252, 254, 256 for the event indications. In each case, the event notifier 306 receives the event ID tag that is associated with the triggered event.

At step S212, the event notifier 306 determines whether a notification definition has been defined for the triggered event. To do so, the event notifier 306 queries the notification definition records with the event ID tag received at step S210 for the notification definition records, if any, that are associated with the event definition record of the triggered event.

If the event notifier 306 locates any notification definition record that are associated with the triggered event, at step S214 the event notifier 306 reads the content parameter and the action parameters of the notification definition record that was located at step S210. As discussed above, the content parameter specifies the scope of the content of the required visual notification. The action parameters specify the action taken when the visual notification is initiated.

Typically, at a minimum, the visual notification indicates the subject matter of the event that has occurred at the handheld communications device 200. For instance, in the case of an incoming e-mail, IM or SMS message, the content parameter might require the event notifier 306 to cause the message software to open a notification window listing the subject matter lines of all messages that have been received by the handheld communications device 200. In the case of a calendar event or a task, the content parameter might require the event notifier 306 to cause the calendar or task management software to open a notification window listing the subject matter lines of all upcoming appointments or tasks due for completion.

Alternately, the content parameter might require the event notifier 306 to display detailed information about a received message, such as the name and/or picture of the originator of the message, subject line and/or all or a portion of the message. In the case of a calendar event or a task, the content parameter might require the event notifier 306 to display the date/time/location of the appointment, or the particulars of the task. In these latter variations, preferably the event notifier 306 requests the required additional information from the appropriate computer program 302 (e.g. message software, calendar software, task management software). Alternately, the computer program 302 that is associated with the triggered event might provide the additional information, at step S208, together with the event signal.

At step S216, the event notifier 306 causes the computer program 302 or operating system specific application 304 that signaled the event notifier 306 to render a notification window on the display device 222, and to provide the visual notification in the notification window, in accordance with the content parameter read at step S214. Typically, the event notifier 306 to renders the notification window while the handheld communications device 200 is still in the idle state.

As discussed above, at step S214 the event notifier 306 reads the action parameters of the notification definition record. One action parameter might require the event notifier 306 to activate the display light of the display device 222 to facilitate viewing of the visual notification on the display device 222. Another action parameter might require the event notifier 306 to maintain the display light on if the user data input device is used, or the handheld communications device 200 is moved, within a predefined period after the display light is activated. Therefore, at step S214 the event notifier 306 also provides the visual notification in accordance with the action parameters read at step S214.

Another action parameter might require the event notifier 306 to de-activate the display light if the user data input device is not used, or the motion sensor 266 does not detect movement of the handheld communications device 200, within a predefined period after the time instant the display light is activated, the user data input device is last used or the handheld communications device 200 is last moved.

Another action parameter might require the event notifier 306 to close the notification window if the user data input device is not used, or the or the handheld communications device 200 is not moved, within a predefined period after the time instant the display light is activated, the notification window is opened, the user data input device is last used, or the handheld communications device 200 is last moved.

Therefore, at step S218, the event notifier 306 monitors the user data input device and the motion sensor (as required), and terminates the visual notification, in accordance with the action parameters read at step S214. The process of steps S208 to S218, repeats, upon the occurrence of the next trigger event.

The user might use the notification profile interface 308 to modify the active notification definitions or to activate other previously-defined notification definitions. Alternately, the user might have configured defined an action parameter that causes the notification profile interface 308 to revert back to a previously-selected notification definition as the active notification definition upon the occurrence of an event. In these latter situations, the event notifier 306 uses the new notification definition, or the new active notification definition, for steps S212 to S218.

We claim:

1. A method of event notification comprising:
receiving an indication of an occurrence of an event at a handheld communications device, the handheld communications device comprising a display device and being configured with a notification definition associated with the event, the display device comprises a light source for illuminating information rendered thereon, the notification definition providing a visual notification of the occurrence of the event, the notification definition comprising a content parameter specifying a scope of content of the visual notification, and an action parameter requiring the communications device to at least illuminate the display device with the light source upon the occurrence of the event and further specifying action to be automatically taken by the communications device after the visual notification is initiated; and
providing the visual notification of the occurrence on the display device in accordance with the associated notification definition, the visual notification comprising providing particulars of the event on the illuminated display device.

2. The method according to claim 1, wherein the event is associated with a software application on the handheld communications device and comprises one of an e-mail software application, a text message software application, and a due date reminder software application.

3. The method according to claim 2, wherein the visual notification providing step comprises rendering a notification window on the display device via the software application, and displaying the particular of the event in the notification window.

4. The method according to claim 3, wherein the handheld communications device comprises a user data input device, and the visual notification providing step further comprises closing the notification window upon expiry of a period of inactivity from the user data input device.

5. The method according to claim 3, wherein the handheld communication device comprises a motion sensor, and the visual notification providing step further comprises closing the notification window upon expiry of a period of non-detection of movement of the handheld communication device via the motion sensor.

6. The method according to claim 1, wherein the visual notification is provided while the communications device is in an idle state.

7. The method according to claim 1, wherein the handheld communications device comprises a user data input device, and the visual notification providing step further comprises de-activating the light source upon expiry of a period of inactivity from the user data input device.

8. The method according to claim 1, wherein the handheld communications device comprises a user data input device, and the visual notification providing step further comprises maintaining the light source active upon detection of activity from the user data input device within a predefined period after commencement of the light source activation step.

9. The method according to claim 1, wherein the handheld communication device comprises a motion sensor, and the visual notification providing step further comprises de-activating the light source upon expiry of a period of non-detection of movement of the handheld communication device via the motion sensor.

10. The method according to claim 1, wherein the handheld communications device comprises a motion sensor, and the visual notification providing step further comprises maintaining the light source active upon detection of movement by the motion sensor within a predefined period after commencement of the light source activation step.

11. The method according to claim 1, wherein the handheld communications device comprises a user data input device, the event comprises one of an incoming message, a calendar appointment, and a predefined task, and the method further comprises updating a read status associated with the event, upon detection of activity from the user data input device within a predefined period after the occurrence of the event.

12. The method according to claim 1, wherein the handheld communication device comprises a motion sensor, the event comprises one of an incoming message, a calendar appointment, and a predefined task, and the method further comprises updating a read status associated with the event, upon detection of movement by the motion sensor within a predefined period after the occurrence of the event.

13. A handheld communications device comprising:
   a display device comprising a light source for illuminating information rendered thereon;
   at least one notification record, each said notification record being associated with an event at the communications device and comprising a notification definition for providing a visual notification of occurrence of the event, the notification definition comprising a content parameter specifying a scope of content of the visual notification, and an action parameter specifying action to be automatically taken by the communications device after the visual notification is initiated; and
   an event notifier in communication with the display device and the at least one notification record, the event notifier being configured to receive an indication of the occurrence of one of the events and to provide a visual notification of the occurrence on the display device in accordance with the associated notification definition, the action parameter requiring the event notifier to at least illuminate the display device with the light source upon the occurrence of the event and further specifying the action to be automatically taken by the communications device after the visual notification is initiated, the visual notification providing particulars of the event on the illuminated display device.

14. The communications device according to claim 13, wherein the event is associated with a software application on the handheld communications device and comprises one of an e-mail software application, a text message software application, and a due date reminder software application.

15. The communications device according to claim 14, wherein the content parameter requires the event notifier to cause the software application to render a notification window on the display device and to display the particulars in the notification window.

16. The communications device according to claim 15, further comprising a user data input device, and the action parameter requires the event notifier to cause the one software application to close the notification window upon expiry of a period of inactivity from the user data input device.

17. The communications device according to claim 15, further comprising a motion sensor, and the action parameter requires the event notifier to cause the one software application to close upon expiry of a period of non-detection of movement of the handheld communication device via the motion sensor.

18. The communications device according to claim 13, wherein the event notifier is configured to generate the visual notification while the communications device is in an idle state.

19. The communications device according to claim 13, further comprising a user data input device, and the action parameter requires the event notifier to deactivate the light source upon expiry of a period of inactivity from the user data input device.

20. The communications device according to claim 13, further comprising a user data input device, and the action parameter requires the event notifier to maintain the light source active upon detection of activity from the user data input device within a predefined period after the activation of the light source.

21. The communications device according to claim 13, further comprising a motion sensor, and the action parameter requires the event notifier to de-activate the light source upon expiry of a period of non-detection of movement of the handheld communication device via the motion sensor.

22. The communications device according to claim 13, further comprising a motion sensor, and the action parameter requires the event notifier to maintain the light source active upon detection of movement by the motion sensor within a predefined period after the activation of the light source.

23. The communications device according to claim 13, further comprising a user data input device, the event comprises one of an incoming message, a calendar appointment, and a predefined task, and the action parameter requires the event notifier to update a read status associated with the event, upon detection of activity from the user data input device within a predefined period after the occurrence of the event.

24. The communications device according to claim 13, further comprising a motion sensor, the event comprises one of an incoming message, a calendar appointment, and a predefined task, and the action parameter requires the event notifier to update a read status associated with the event, upon detection of movement by the motion sensor within a predefined period after the occurrence of the event.

25. A non-transitory computer readable medium carrying processing instructions for a handheld communications device, the handheld communications device comprising a display device and being configured with a notification definition, the display device comprises a light source for illuminating information rendered thereon, the processing instructions, when executed by a computer processor of the communications device, enabling the handheld communication device to implement the following method:
   receiving an indication of an occurrence of an event at the handheld communications device, the event being associated with the notification definition or providing a visual notification of the occurrence of the event, the notification definition comprising a content parameter specifying a scope of content of the visual notification, and an action parameter requiring the communications device to at least illuminate the display device with the light source upon the occurrence of the event and further specifying action to be automatically taken by the communications device after the visual notification is initiated; and
   providing the visual notification of the occurrence on the display device in accordance with the associated notification definition, the visual notification providing particulars of the event on the illuminated display device.

* * * * *